Figure 1:
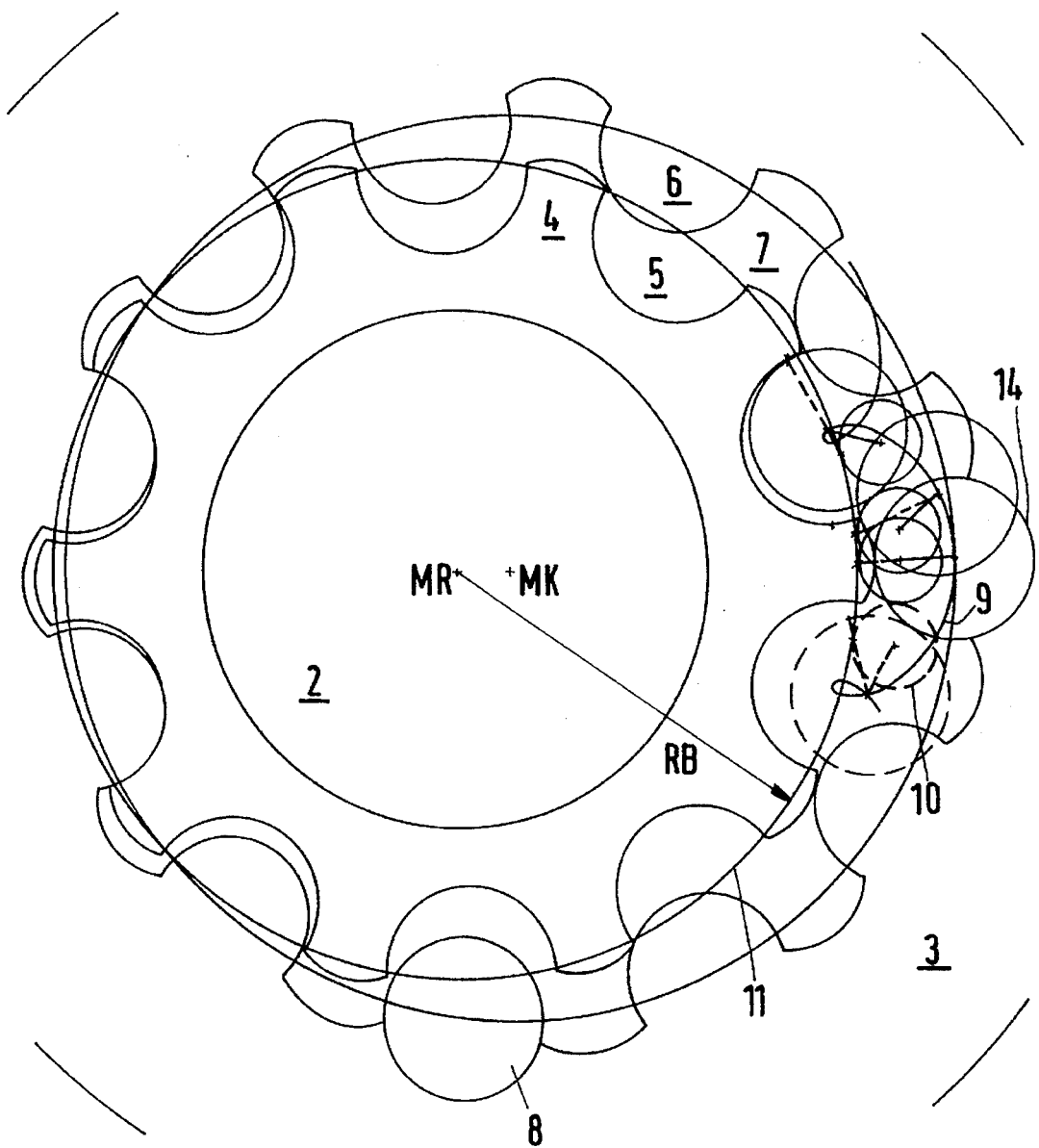

United States Patent [19]
Hansen et al.

[11] Patent Number: 5,649,815
[45] Date of Patent: Jul. 22, 1997

[54] HYDRAULIC MACHINE AND METHOD OF PRODUCING THE CONTOUR OF A GEARWHEEL OF A HYDRAULIC MACHINE

[75] Inventors: Gunnar Lyshøj Hansen; Hans Christian Petersen, both of Nordborg, Denmark

[73] Assignee: Danfoss A/S, Nordborg, Denmark

[21] Appl. No.: 535,006

[22] PCT Filed: Mar. 25, 1994

[86] PCT No.: PCT/DK94/00126

§ 371 Date: Nov. 30, 1995

§ 102(e) Date: Nov. 30, 1995

[87] PCT Pub. No.: WO94/23207

PCT Pub. Date: Oct. 13, 1994

[30] Foreign Application Priority Data

Apr. 5, 1993 [DE] Germany .......................... 43 11 169.6

[51] Int. Cl.⁶ .................... F03C 2/08; F04C 2/10
[52] U.S. Cl. ........................... 418/1; 418/171
[58] Field of Search ............... 418/1, 150, 166, 418/171

[56] References Cited

U.S. PATENT DOCUMENTS

| | | | |
|---|---|---|---|
| 4,518,332 | 5/1985 | Saegusa | 418/150 |
| 4,657,492 | 4/1987 | Saegusa | 418/171 |
| 4,673,342 | 6/1987 | Saegusa | 418/150 |

*Primary Examiner*—John J. Vrablik
*Attorney, Agent, or Firm*—Lee, Mann, Smith, McWilliams, Sweeney & Ohlson

[57] ABSTRACT

A hydraulic machine is disclosed, with an annular gear with internal teeth and, eccentrically mounted in the annular gear, a gearwheel with external teeth which engage with the internal teeth, the internal teeth comprising one more tooth than the external teeth and the contour of the external teeth being formed by an envelope of a system of generating circles, the midpoints of which lie on a trochoid which, as a rolling circle rolls without slipping on a base circle, can be generated by the movement of a point lying on a radial ray of the rolling circle co-rotating with the rolling circle. A method of producing the contour of a rear wheel of such a machine is also disclosed. In such a machine it is desirable to realize a satisfactory inner seal and low Hertzian stresses. To that end, the spacing of the point from the midpoint of the rolling circle is larger than the radius of the rolling circle. The tooth form can then be formed by the end points of a system of line segments which are located at right angles to the trochoid and are the same length as the radii of the generating circles, wherein the trochoid encloses a closed inner face and separates it from an outer face and several intermediate faces, and the line segments are, arranged only in the inner face.

8 Claims, 3 Drawing Sheets

HYDRAULIC MACHINE AND METHOD OF PRODUCING THE CONTOUR OF A GEARWHEEL OF A HYDRAULIC MACHINE

The invention relates to a hydraulic machine with an annular gear with internal teeth and, eccentrically mounted in the annular gear, a gearwheel with external teeth which engage with the internal teeth, the internal teeth comprising one more tooth than the external teeth and the contour of one of the sets of teeth being formed by an envelope of a system of generating circles, the midpoints of which lie on a trochoid which, as a rolling circle rolls without slipping on a base circle, can be generated by the movement of a point lying on a radial ray of the rolling circle co-rotating with the rolling circle.

Moreover, the invention relates to a method of producing the contour of a gearwheel or annular gear of such a hydraulic machine, in which a trochoid is generated using a rolling circle rolling without slipping on a base circle and a point lying on a radial ray of the rolling circle co-rotating with the rolling circle.

A machine of that kind and a method of that kind are known from U.S. Pat. No. 2,421,463. In machines of that kind, the radius of the base circle is an integral multiple of the radius of the rolling circle, the multiplication factor corresponding to the number of teeth of the gearwheel. According to Dubbel, "Taschenbuch für Maschinenbau", 13th edition, volume 1, Berlin, Heidelberg, New York 1970, page 144, the trochoid described can also be generated other than by rolling two pairs of circles.

Machines of the known kind have proved useful as pumps or as motors in many instances of application. However, there are always problems with the internal seal and with the formation of Hertzian stresses. The internal seal is impaired by leaks, as a consequence of which the hydraulic fluid is able to escape at the sealing points between internal teeth and external teeth from areas of relatively high pressure to areas of lower pressure. Hertzian stresses affect the "lubricity" and thus the wear and tear on the machine.

The invention is based on the problem of producing a hydraulic machine having a relatively large displacement and a method of creating the contour of a gearwheel of such a machine.

This problem is solved in a hydraulic machine of the kind mentioned in the introduction in that the spacing of the point from the midpoint of the rolling circle is larger than the radius of the rolling circle.

For the sake of simplicity, the following explanations relate to the formation of the contour of a gearwheel. A corresponding procedure is used to form the contour of an annular gear.

The displacement of the machine is closely allied to the magnitude of eccentricity, that is to say, the spacing of the point from the midpoint of the rolling circle, so that a small eccentricity corresponds to a relatively small displacement. Previously, the rolling circle radius had been regarded as the upper limit for the magnitude of the eccentricity, inter alia because the trochoid forms loops, that is, crosses over itself along its circumference when the eccentricity becomes larger. This also leads to the system of circles being superimposed on themselves. Despite this, it produces an envelope or generating curve of an envelope, which defines the form of the gearwheel. The gearwheel has in that case relatively deep tooth spaces with relatively sharp-edged teeth projecting steeply between the spaces. Such a gearwheel contour surprisingly provides a good engagement factor, and consequently a good seal between adjacent chambers, which are pressurized with a pressure difference and which are defined by the co-operation of internal teeth and external teeth, and low Hertzian stresses.

It is also preferred for the ratio of the spacing of the point from the midpoint to the radius of the rolling circle to lie in the range from 1.25 to 1.6 and for the ratio of the radius of the generating circles to the radius of the rolling circle to lie in the range from 1.8 to 2.2. Excellent meshing ratios are achieved with these ratios.

Preferably, the midpoints of the generating circles of the system are arranged side by side in a circumferential direction of the trochoid, the circumferential direction reversing at crossing points of the trochoid. The gearwheel can therefore also be produced with rotating tools, as is known, for example, from U.S. Re. Pat. No. 21,316. The midpoint of such a rotating tool can now be guided on the trochoid and, despite the intersection of the trochoid, can produce the contour of the gearwheel so that this is continuously formed in the circumferential direction. Without this measure, when forming the contour of the gearwheel the rotating tool would have to engage repeatedly in areas already machined.

In an advantageous embodiment, provision is made for the radius of the base circle to vary periodically in the circumferential direction with the tooth pitch of the gearwheel, at least one of the parameters radius of the rolling circle, radius of the generating circles and/or spacing of the point from the midpoint being correspondingly, especially continuously, concomitantly varied. By varying at least two of the variables required for generating the trochoid, a number of advantageous effects can be achieved. For example, the tooth flanks and the tooth tips can be formed by different trochoids. In that case, one is no longer restricted to finding a compromise which optimizes both the seal at tooth tip to tooth tip sealing points and the rolling behaviour of tooth flank to tooth flank sealing points. The trochoids and the other variables used for creating the gearwheel contour can be selected section by section, so that in each section the optimum is achieved.

Advantageously, the internal teeth are in the form, at least in the region of their teeth tips, of reference cylinders. It has been shown that external teeth with internal teeth in the form of reference cylinders give the best results.

It is preferred for the internal teeth to be in the form of rollers. This reduces wear. Correspondingly, the external teeth can also be formed by reference cylinders or rollers, if the internal teeth are formed by the trochoids. In that case, however, it is only the eccentricity that can be varied.

It is especially preferred for the radius of the reference cylinder to correspond to that of the generating circles in that region. This produces an excellent seal for the situation in which an internal tooth enters a tooth space of the external teeth.

In a method of the kind mentioned in the introduction, the problem is solved in that the point is selected outside the rolling circle and the tooth form is formed by the end points of a system of line segments which are located at right angles to the trochoid and are the same length as the radii of the generating circles, wherein the trochoid encloses a closed inner face and separates it from an outer face and several intermediate faces, and the line segments are arranged only in the inner face.

The contour of the gearwheel cannot in all cases be formed using rotating tools. This type of manufacture is limited to specific materials. In order, however, to be able to manufacture the gearwheel by sawing, spark erosion machining or other separating processes, first of all a line along which the tool is moved has to be determined. This line corresponds to the contour line of the gearwheel.

Trochoids which form loops are affected by the problem that the envelope of the system of curves can be described mathematically only with difficulty. The use of line segments as a substitute for the radii does not produce the desired result, however. This is only achieved when the line segments are arranged in the described manner, namely, only in the inner face. The inner face is in that case defined as the part of the plane which is completely enclosed by the trochoid. The intermediate faces are the regions inside the loops formed by the trochoid and the outer face is the remaining part of the continuous plane.

This can be achieved in a simple manner in that the trochoid has an inside and an outside, wherein the line segments lie in the region of a tooth tip on the inside, change to the outside as they pass a crossing point of the trochoid for the first time and change back again to the inside of the trochoid as they pass the crossing point for the second time. The inside and outside of the trochoid can be defined in that an imaginary observer on the trochoid moves in a predetermined direction. The inside is then always on the one side, for example, the left-hand side, of the observer. The outside is then always on the other side, for example, the right-hand side of the observer. The side that faces the gearwheel in the region of the tooth tips of the gearwheel is defined as the inside. This simple step, that is, the changing of sides by the line segments, enables the contour of the gearwheel to be clearly determined in all regions. There is no over definition, and the desired tooth form is achieved.

Figure 2:
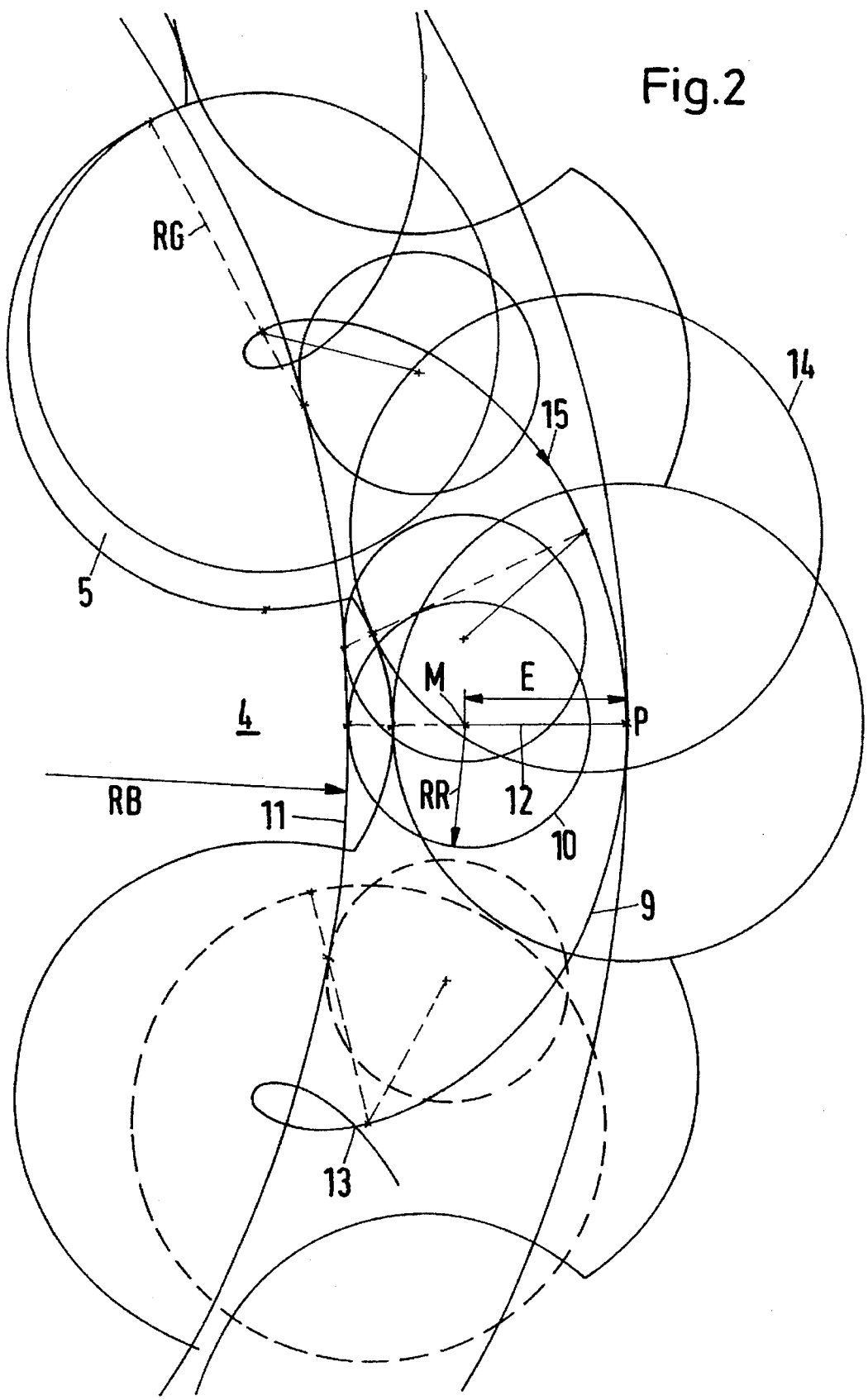
Figure 3:
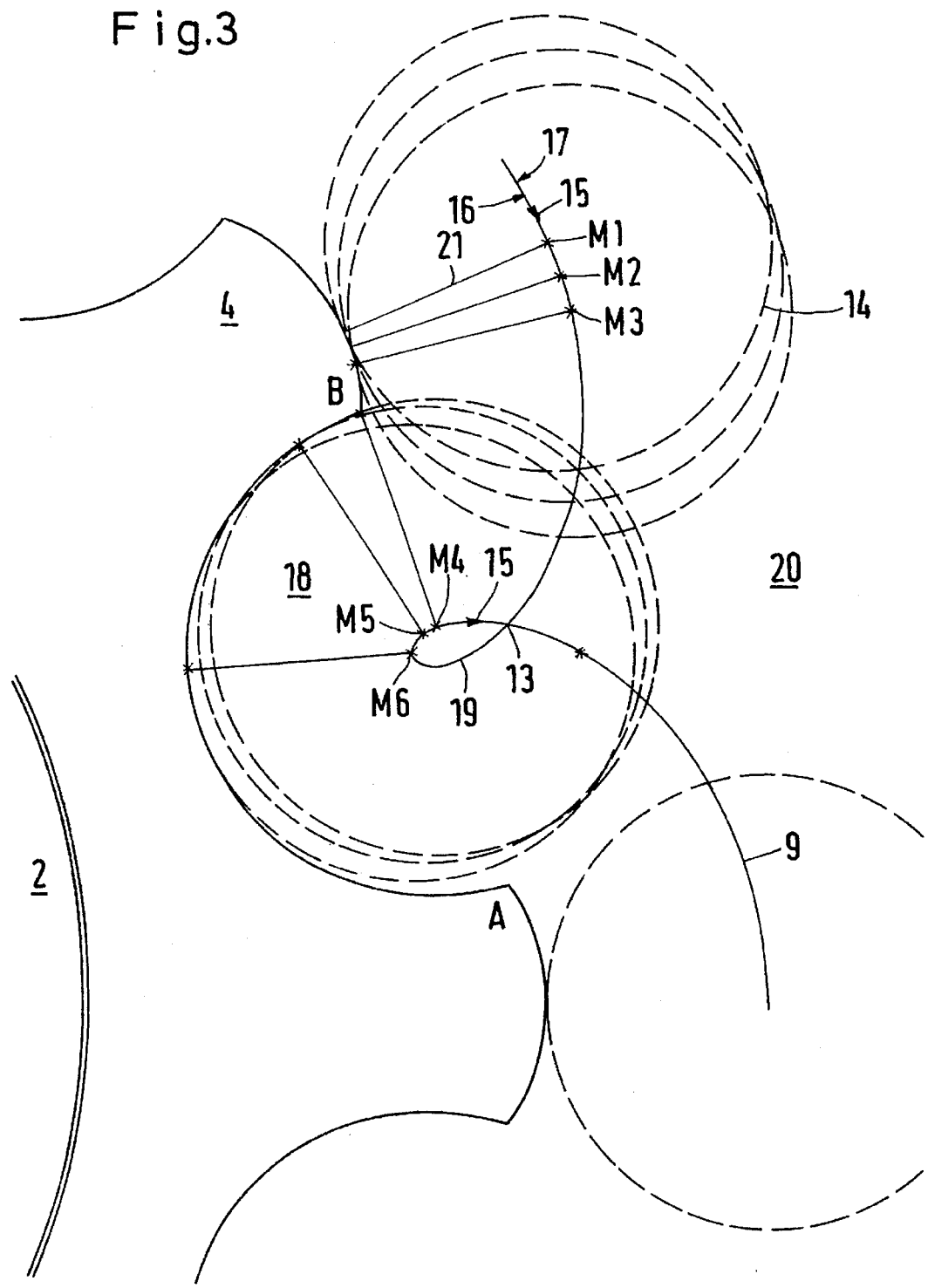

The invention is described in the following with reference to a preferred embodiment and in conjunction with the drawing, in which FIG. 1 shows a diagrammatic representation of a hydraulic machine in cross-section, FIG. 2 is an enlarged fragmentary view from FIG. 1, and FIG. 3 is a more detailed view illustrating the development of the tooth form.

FIG. 1 shows a hydraulic machine 1 which comprises a gearwheel 2 with a midpoint MR and an annular gear 3 with a midpoint MK. The gearwheel 2 is eccentrically mounted in the annular gear 3 and has a plurality of external teeth 4 which are separated from one another by tooth spaces 5. Together with the tooth spaces, the external teeth 4 form an external toothing. The annular gear 3 has a plurality of internal teeth 6, which are separated from one another by tooth spaces 7. Together with the tooth spaces 7, the internal teeth 6 form an internal toothing. The number of internal teeth 6 exceeds the number of external teeth 4 by one. In this particular example, ten external teeth 4 are provided and eleven internal teeth 6 are provided. The internal teeth 6 are formed by rollers 8 which are rotatably mounted in the annular gear 3. One roller 8 is illustrated by way of example. The internal teeth 6 consequently define the form of a reference cylinder.

The external teeth 4, that is, the contour of the gearwheel 2, are produced by means of a trochoid 9. Generation of the trochoid 9 is shown most clearly in FIG. 2. The trochoid can be generated, for example, in that a rolling circle 10 of radius RR rolls on a base circle 11 of radius RB. The rolling circle 10 has a radial ray 12 which is fixed in the rolling circle 10 in a predetermined angular position and is rotated with the rolling circle 10 as the latter rolls on the base circle 11. At a distance E from the midpoint M of the rolling circle 10, which is larger than the radius RR of the rolling circle 10, a point P is arranged on the radial ray 12. If the rolling circle 10 now rolls without slipping on the base circle 11, the point P describes the trochoid 9. As is generally well known (see, for example, Dubbel, "Taschenbuch für Maschinenbau", 13th edition, volume 1, Berlin, Heidelberg, New York 1970, page 143 to 146), such a trochoid can also be generated other than by rolling two circles on one another. It is not intended to go into this more fully here, however. The single most important factor is that the trochoid 9 has the form illustrated, that is to say, has crossing points 13 at which the trochoid intersects itself.

Arranged on the trochoid 9 is a system of generating circles 14 of radius RG. The envelope of this circle system forms the contour of the gearwheel 2.

For ease of understanding, in the following description a circumferential direction which is denoted by the arrow 15 is defined for the trochoid. An observer moving on the trochoid in the circumferential direction would see on his right-hand side an inside 16 of the trochoid 9 and on his left-hand side an outside 17 of the trochoid 9. The inside 16 is that side which in the region of an external tooth 4 faces that external tooth. Furthermore, the trochoid 9 divides the plane into three regions (see FIG. 3), namely, an inner face 18, which is completely enclosed by the trochoid 9 and in which the gearwheel 2 lies, a plurality of intermediate faces 19, which are bounded by the inside 16 of the trochoid 9 between the two points of the trochoid 9 that lie one on top of the other at the crossing point 13, and an outer face 20 as the remaining region of the plane.

If the system of generating circles 14 were now allowed to run along the trochoid without additional measures, then first of all, for example, (FIG. 3) a region A of the gearwheel 2 would be machined and then a region B of the gearwheel. The outer contour of the gearwheel would then no longer occur one pass after another. On the contrary, the formation would change or jump. When producing the gearwheel 2 using rotating tools this can become critical, since in a procedure of that kind a portion of material remains behind in the region B which can easily be torn away during subsequent machining if the material is not suitable for such treatment. For that reason, when producing the contour a different procedure is selected. The circles are arranged in order in the circumferential direction 15 of the trochoid 9 but only as far as a crossing point 13. From there, they are ranged counter to the circumferential direction 15 until they again reach the same crossing point 13. Whereas the circles with midpoints M1, M2 and M3 are arranged in this order in the circumferential direction 15 on the trochoid 9, the circles with midpoints M4, M5, M6, which are located on the loop between points that form the crossing point 13, are arranged counter to the circumferential direction 15. This step enables region B of the gearwheel to be produced before region A. The contour of the gearwheel 2 is therefore produced pass by pass. Jumps during production or a reversal of the direction of movement of the tool travelling past are avoided.

For optimization, the radius of the base circle, the radius of the rolling circle, the radius of the generating circles and/or the spacing of the point from the midpoint can, in a manner not illustrated, periodically be varied, especially continuously, with the tooth pitch; to avoid irregularities in the contour during this variation, the changes must be correspondingly matched to one another. At least two variables must be changed together. Alternatively, several variables can be changed simultaneously.

Since the contour of the gearwheel 2 cannot always be produced using rotating tools that are in the form of the generating circles 14, the following passage describes how a contour line for the gearwheel 2 can be generated, on which a different tool, for example, a saw or spark erosion machine, can be moved to produce the contour of the gearwheel 2. This may be necessary, for example, in the case of sintered materials. The gearwheel is in that case no longer produced by the generating circles 14, but by a system of line segments 21 which are located at right angles to the trochoid 9 and the length of which corresponds to the radius RG of the generating circles. These line segments are arranged only in the inner face 18, that is to say, they change when they reach the crossing point 13 from the inside 16 of the trochoid to its outside 17. When they next pass the crossing point 13 they change back again to the inside. Thus, for example, the line segments 21 starting from the midpoints M1, M2, M3 are arranged on the inside 16 of the trochoid, while the line segments starting from the midpoints M4, M5 and M6 are arranged on the outside 17 of the trochoid. In this way it is possible to determine the path for a tool which produces the contour of the gearwheel 2 by a simple cutting operation, such as sawing or spark erosion machining.

To achieve optimum engagement factors, the ratio E/RR, that is, the ratio of the distance E of the point P from the midpoint M to the radius RR of the rolling circle, should lie in the range from 1.25 to 1.6. The ratio RG/RR, that is, the ratio of the radii RG of the generating circle 14 and RR of the rolling circle RR, should lie in the range from 1.8 to 2.2.

This particular example describes the situation in which the external teeth are produced by means of the trochoid, while the inner teeth are formed by rollers. It goes without saying that the internal teeth can be generated equally well by means of a trochoid if the external teeth are formed by rollers or fixed reference cylinder portions.

We claim:

1. A hydraulic machine with an annular gear with internal teeth and, eccentrically mounted in the annular gear, a gearwheel with external teeth which engage with the internal teeth, the external teeth having one more tooth than the internal teeth and the contour of one of the sets of teeth being formed by an envelope of a system of generating circles, midpoints of said circles lying on a trochoid which, as a rolling circle rolls without slipping on a base circle, can be generated by the movement of a point lying on a radial ray of the rolling circle co-rotating with the rolling circle, and in which the spacing of the point from the midpoint of the rolling circle is larger than the radius of the rolling circle.

2. A machine according to claim 1, in which the ratio of the spacing of the point from the midpoint to the radius of the rolling circle lies in a range from 1.25 to 1.6 and the ratio of the radius of the generating circles to the radius of the rolling circle lies in a range from 1.8 to 2.2.

3. A machine according to claim 1, in which the midpoints of the generating circles of the system are arranged side by side in a circumferential direction of the trochoid, and in a region of the trochoid which is bounded by a crossing point, the generating circles are arranged counter to the circumferential direction.

4. A machine according to claim 1, in which the internal teeth are in the form of reference cylinders in at least a region of tips of the internal teeth.

5. A machine according to claim 4, in which the internal teeth are in the form of rollers.

6. A machine according to claim 4, in which the radius of the reference cylinder corresponds to the radius of the generating circles.

7. A method of producing the contour of a gearwheel or annular gear of a hydraulic machine according to claim 10, including generating a trochoid using a rolling circle rolling without slipping on a base circle and a point lying on a radial ray of the rolling circle co-rotating with the rolling circle, and in which the point is selected outside the rolling circle and the contour has a tooth form formed by end points of a system of line segments which are located at right angles to the trochoid and are the same length as the radii of the generating circles, wherein the trochoid encloses a closed inner face and separates the inner face from an outer face and several intermediate faces, and the line segments are arranged only in the inner face.

8. A method according to claim 7, in which the trochoid has an inside and an outside, wherein the line segments lie in the region of a tooth tip on the inside, change to the outside as the line segments pass a crossing point of the trochoid for a first time and change back again to the inside of the trochoid as the line segments pass the crossing point for a second time.

* * * * *